United States Patent [19]

Cheetham et al.

[11] 4,340,832
[45] Jul. 20, 1982

[54] DYNAMOELECTRIC MACHINE BRUSH HOLDER

[75] Inventors: Robert A. Cheetham, Anderson; Ralph E. Sears, McCordsville, both of Ind.

[73] Assignee: General Motors Corporation, Detroit, Mich.

[21] Appl. No.: 196,835

[22] Filed: Oct. 14, 1980

[51] Int. Cl.³ .......................................... H02K 13/00
[52] U.S. Cl. ..................................... 310/239; 310/249
[58] Field of Search ............... 310/238, 239, 240, 241, 310/242, 244, 245, 246, 247, 248, 249

[56] References Cited

U.S. PATENT DOCUMENTS

| | | | |
|---|---|---|---|
| 728,273 | 5/1903 | Mix | 310/245 |
| 983,230 | 1/1911 | Hohme | 310/245 |
| 1,727,917 | 9/1929 | Zerbo | 310/246 |
| 2,875,356 | 2/1959 | Hallidy | 310/245 |
| 4,166,227 | 8/1979 | Guglielmo | 310/242 |
| 4,221,046 | 9/1980 | Hayes | 310/239 |
| 4,230,962 | 10/1980 | Carda | 310/239 |
| 4,296,346 | 10/1981 | Ooki | 310/242 |

FOREIGN PATENT DOCUMENTS

| 1138810 | 1/1967 | United Kingdom | 310/239 |
|---|---|---|---|
| 720597 | 12/1978 | U.S.S.R. | 310/239 |

*Primary Examiner*—R. Skudy
*Attorney, Agent, or Firm*—Richard G. Stahr

[57] ABSTRACT

A unitary dynamoelectric machine brush holder formed to provide a brush accommodating recess bounded on three sides by two opposing substantially parallel side segments and a transverse segment. Extending from one of the side segments is a pair of spaced spring retainer members formed to provide respective spring retaining recesses in which is mounted a unitary torsion spring having two coils separated by a loop portion that extends between the spring retainer members into the brush accommodating recess and is arranged to exert pressure on a brush located within the brush accommodating recess.

2 Claims, 7 Drawing Figures

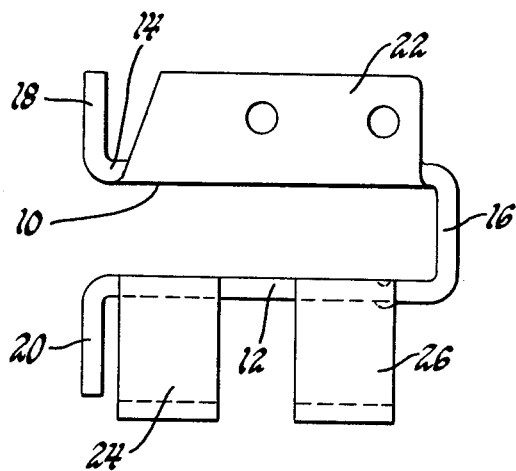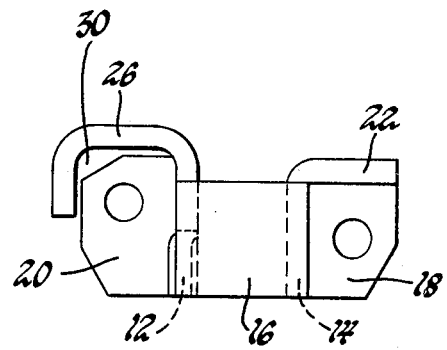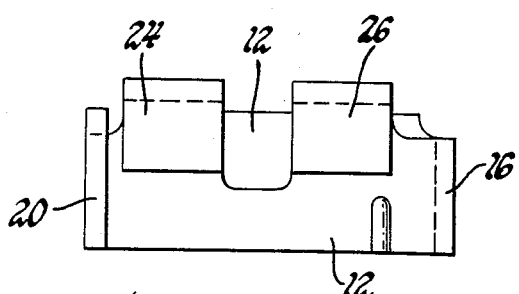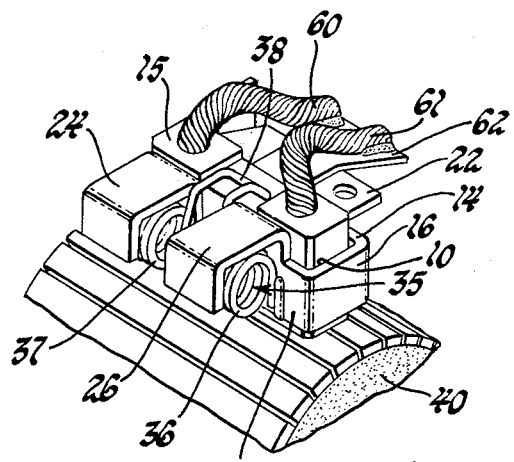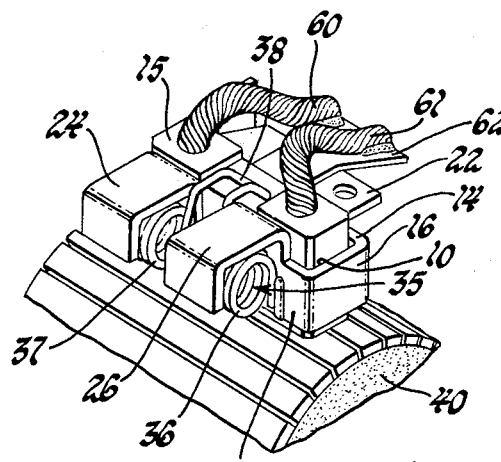

DYNAMOELECTRIC MACHINE BRUSH HOLDER

This invention is directed to dynamoelectric machine brush holders and, more specifically, to a unitary brush holder formed to provide a brush accommodating recess bounded on three sides by two opposing substantially parallel side segments and a transverse segment.

In heavy duty dynamoelectric machine applications, it is important that the commutator brushes be securely positioned relative to the commutator and be maintained in substantially radial alignment relative to the commutator under all operating conditions. Therefore, a heavy duty dynamoelectric machine brush holder that securely positions the commutator brush in substantial radial alignment with the commutator with a minimum of parts is desirable.

It is, therefore, an object of this invention to provide an improved dynamoelectric machine brush holder.

It is another object of this invention to provide an improved dynamoelectric machine brush holder comprising a unitary member of a suitable material formed to provide a brush accommodating recess bounded on three sides by two opposing substantially parallel side segments and a transverse segment.

It is another object of this invention to provide an improved dynamoelectric machine brush holder made up of a unitary member of a suitable material formed to provide a brush accommodating recess bounded on three sides by two opposing substantially parallel side segments and a transverse segment that includes a pair of spaced spring retainer members extending from one of the side segments that are formed to provide respective spring retaining recesses in which is mounted a unitary torsion spring having two coils separated by a loop portion that extends between the spring retainer members into the brush accommodating recess and is arranged to exert a pressure on a brush located within the brush accommodating recess.

In accordance with this invention, a dynamoelectric machine brush holder is provided wherein a unitary member formed to provide a brush accommodating recess bounded on three sides by two opposing substantially parallel side segments and a transverse segment has a pair of spaced spring retainer members extending from one of the side segments that are formed to provide respective spring retaining recesses in which is mounted a unitary torsion spring having two coils separated by a loop portion that extends between the spring retainer members into the brush accommodating recess and is arranged to exert a pressure on a brush located within the brush accommodating recess.

For a better understanding of the present invention, together with additional objects, advantages and features thereof, reference is made to the following description and accompanying drawing in which:

FIG. 1 is a top view of the brush holder of this invention;

FIG. 2 is an end view of the brush holder of this invention;

FIG. 3 is a side view of the brush holder of this invention;

FIG. 4 is a bottom view of the brush holder of this invention;

FIG. 5 is a perspective view of the brush holder of this invention including a brush positioned in the brush accommodating recess;

Figure 6:
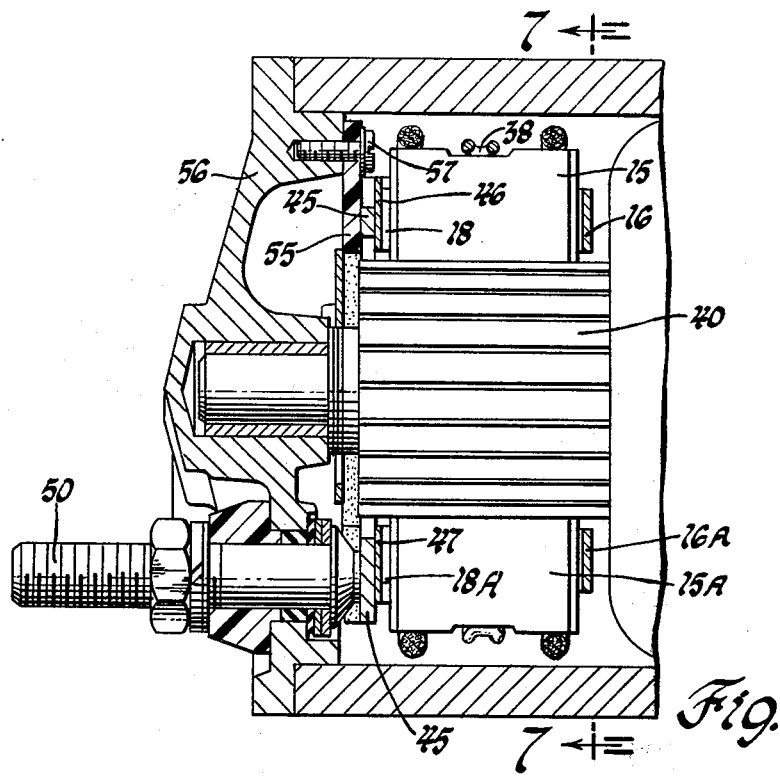
FIG. 6 is a partial elevation view in section of the commutator end of a dynamoelectric machine in which the brush holder of this invention is installed.

As is best seen in FIG. 4, the dynamoelectric machine brush holder of this invention comprises a unitary member of a suitable material such as brass that is formed to provide a brush accommodating recess 10 bounded on three sides by two opposing substantially parallel side segments 12 and 14 and a transverse segment 16. A conventional dynamoelectric machine carbon brush such as that shown in FIG. 5 and referenced by the numeral 15 is supported within the brush accommodating recess 10 in a plane substantially normal to the plane of the transverse segment 16.

A pair of mounting flanges extend in opposite directions from and substantially normal to the ends of the side segments 12 and 14 remote from the transverse segment 16 and are arranged to lie in a common plane substantially normal to the plane of brush 15 when mounted within the brush accommodating recess 10.

A brush lead lug accommodating flange 22 extends from and substantially normal to a selected one of the side segments 14 in a direction away from the brush accommodating recess 10 at a location between the transverse segment 16 and the mounting flange 18 of the same side segment 14.

A pair of spring retainer members 24 and 26 extend from and are located in spaced relationship along the other one of the side segments 12 between the transverse segment 16 and the mounting flange 20 of side segment 12. Spring retainer members 24 and 26 are formed to provide respective spring retaining recesses 28 and 30 adjacent to and outboard of the brush accommodating recess 10.

As best seen in FIG. 5, a unitary torsion spring 35 having two coils 36 and 37 separated by an intermediate loop portion 38 is positioned in such a manner that coil 36 is accommodated by spring retaining recess 30 as formed by spring retainer member 26 and coil 37 is accommodated by the spring retaining recess 28 formed by spring retainer member 24. The intermediate loop portion 38 is of such a dimension as to extend between the spring retainer members 24 and 26 into brush accommodating recess 10 and has a section thereof offset in such a direction as to engage a brush 15 located within the brush accommodating recess 10 to exert a pressure on brush 15. In FIG. 5, as looking in the direction away from transverse segment 16, unitary torsion spring 35 is so wound that the intermediate loop portion 38 tends to be forced in a clockwise direction to exert a downward force toward commutator 40 to force brush 15 into sliding engagement with the segment of commutator 40 as is well known in the dynamoelectric machine art.

FIG. 6 is a partial elevation view in section of the commutator end of a dynamoelectric machine with which the brush holders of this invention may be employed. In this section view, only two of the brush holders of this invention are shown with the brushes referenced by the numerals 15 and 15A and the respective transverse segments being referenced by the numerals 16 and 16A. As these two brushes 15 and 15A are the power return brushes for each of two parallel armature circuits, the mounting flanges 18 and 18A are electrically secured to a conductive ring 45 with respective conductive spacers 46 and 47 disposed between respective mounting flanges 20 and 20A and conductive ring 45. To provide an external electrical connection to brushes 15 and 15A, a conductive stud 50 is also electrically connected to conductive ring 45. With this arrangement, brushes 15 and 15A are electrically connected together through conductive ring 45 and may be connected to an external source of electrical power through stud 50. The conductive ring 45 is secured to an annular insulating member 55 that is discontinuous in the area of conductive stud 50. The entire unit comprising all of the brush holders, the conductive spacers, the conductive ring and the annular insulating member are secured as a unit to the dynamoelectric machine end housing 56 by suitable fastening means such as screws 57.

Figure 7:
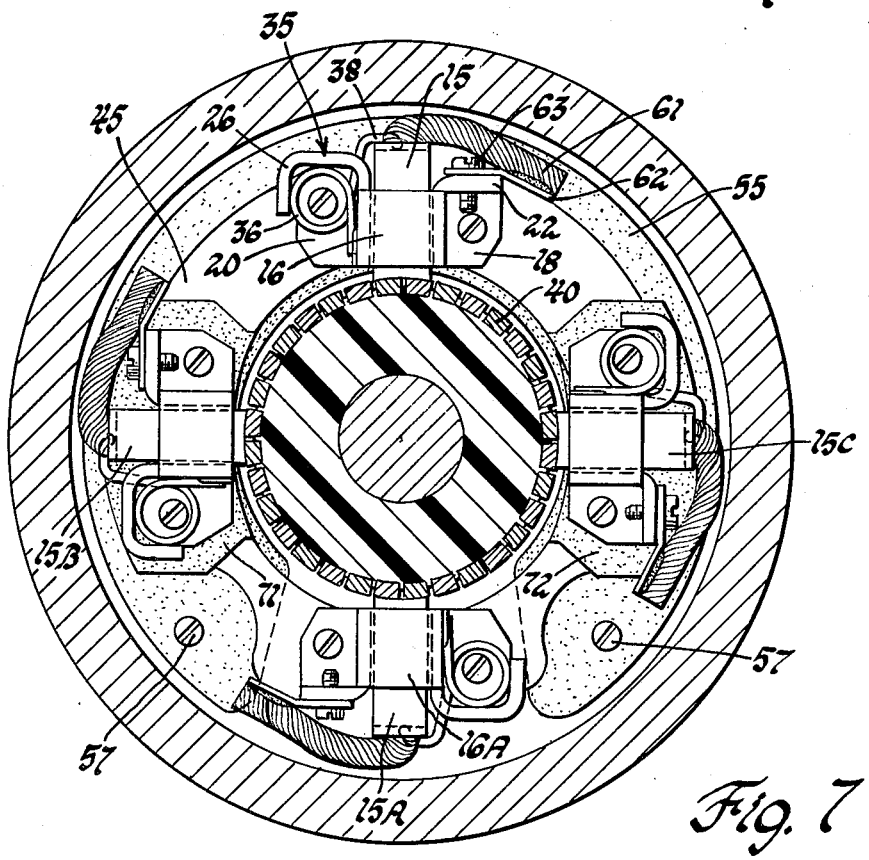
FIG. 7 is a section view of FIG. 6 taken along the line 7—7 and looking in the direction of the arrows.

In FIG. 7 that is a section view of FIG. 6 taken along line 7—7 and looking in the direction of the arrows, four of the brush holders of this invention are shown to be mounted in a dynamoelectric machine. As all of the brush holders are identical, in the interest of reducing drawing complexity, reference numerals are provided for only one of the brush holders in this figure.

As best seen in FIG. 5, the dual brush leads 60 and 61 are electrically secured such as by welding to a brush lead lug 62. Brush lead lug 62 may be secured by a screw 63, FIG. 7, to the brush lead lug accommodating flange 22.

The brush holders accommodating brushes 15B and 15C are insulated from the conducting ring 45 by respective insulating spaces 71 and 72. Therefore, electrical power may be applied to brushes 15B and 15C in parallel by proper electrical connections to respective brush lead lug accommodating flanges and through conductive stud 50. With these connections, brushes 15B and 15C provide parallel armature circuits with the return through respective brushes 15 and 15A.

While a preferred embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. A dynamoelectric machine brush holder comprising:
    a unitary member of a suitable material formed to provide a brush accommodating recess bounded on three sides by two opposing substantially parallel side segments and a transverse segment;
    a pair of mounting flanges extending in opposite directions from and substantially normal to the ends of said side segments remote from said transverse segment;
    a brush lead lug accommodating flange extending from a selected one of said side segments in a direction away from said brush accommodating recess at a location between said transverse segment and said mounting flange;
    a pair of spring retainer members extending from and located in spaced relationship along the other one of said side segments between said transverse segment and said mounting flange with each of said retainers being formed to provide a respective spring retaining recess adjacent said brush accommodating recess;
    and a unitary torsion spring having two coils separated by an intermediate loop portion positioned in such a manner that each said coil is accommodated by a respective said spring retaining recess with said intermediate loop portion extending between said spring retainer members into said brush accommodating recess and arranged to exert a pressure on a brush located within said brush accommodating recess.

2. A dynamoelectric machine brush holder comprising:
    a unitary member of a suitable material formed to provide a brush accommodating recess bounded on three sides by two opposing substantially parallel side segments and a transverse segment for supporting a brush in a plane substantially normal to the plane of said transverse segment;
    a pair of mounting flanges extending in opposite directions from and substantially normal to the ends of said side segments remote from said transverse segment and lying in a common plane substantially normal to the plane of said brush;
    a brush lead lug accommodating flange extending from and substantially normal to a selected one of said side segments in a direction away from said brush accommodating recess at a location between said transverse segment and said mounting flange;
    a pair of spring retainer members extending from and located in spaced relationship along the other one of said side segments between said transverse segment and said mounting flange with each of said retainers being formed to provide a respective spring retaining recess adjacent to and outboard of said brush accommodating recess;
    and a unitary torsion spring having two coils separated by an intermediate loop portion positioned in such a manner that each said coil is accommodated by a respective said spring retaining recess, said intermediate loop portion being of such a dimension as to extend between said spring retainer members into said brush accommodating recess and having a section thereof offset in such a direction as to engage a brush located within said brush accommodating recess to exert a pressure on said brush.

* * * * *